H. H. COLE.
Twin-Hooks.
No. 200,510. Patented Feb. 19, 1878.
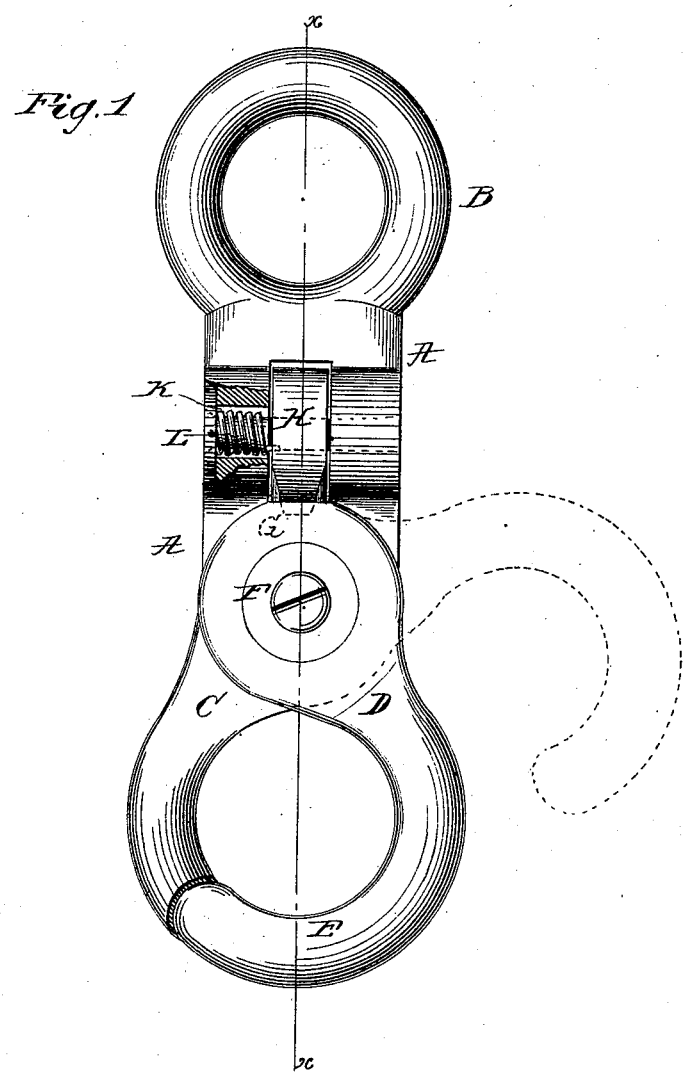
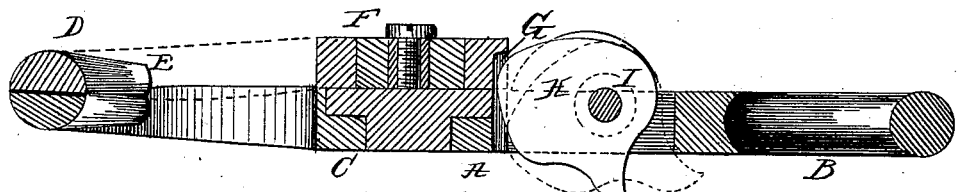

UNITED STATES PATENT OFFICE.

H. HARRISON COLE, OF PHILADELPHIA, PENNSYLVANIA.

IMPROVEMENT IN TWIN HOOKS.

Specification forming part of Letters Patent No. 200,510, dated February 19, 1878; application filed August 2, 1877.

*To all whom it may concern:*

Be it known that I, H. HARRISON COLE, of the city and county of Philadelphia, and State of Pennsylvania, have invented a new and useful Improvement in Twin Hooks for Ships' Tackle and other purposes; and I do hereby declare the following to be a sufficiently full, clear, and exact description thereof to enable others skilled in the art to make and use the said invention.

The nature of my invention consists in so hinging together the two hooks forming a twin hook that a suitable cam, combined with the hooks, will engage in a recess or notch in one hook by reason of the application of a spring, so that when the hook is closed it is securely held in that position until intentionally liberated by raising the cam from the notch in the hook.

I will now proceed to describe more particularly in detail the manner in which my invention is made and operated, referring, in so doing, to the drawing annexed and forming a part of this specification, and the letters of reference marked thereon.

Figure 1 is a plan, showing in full lines the hook when closed, and in dotted lines the hook when opened; and Fig. 2 is a vertical section of the hook made in the plane indicated by the dotted lines $x\,x$ in Fig. 1. The cam is shown in full lines in this figure when engaged in the notch of the hook, and in dotted lines when liberated.

The same letters of reference apply to the same parts in the several figures.

A is a hook, formed with an eye, B, for attaching it to a line or block. C is a bow or hook formed on its lower end, made semicircular in cross-section, as shown in Fig. 2. D is another hook, also of a semicircular form in its bow E, and strongly hinged or pivoted at F to the hook A, so as to turn with the flat side of the bow F against the flat side of the bow C.

When the two bows F and C are placed against each other they form an eye or ring of circular section, and will retain any other ring which may be engaged or linked therein, so that it cannot be liberated until the hooks are opened.

To hold the hooks A and D with their bows F and C in closed position, I cut a notch, G, in the joint of the hook D, in which a cam or latch, H, turning upon a rivet, I, in a slot, K, in the hook A, engages and is held by a spring, L, applied to the cam H either open or shut, as the latch may be turned.

A knob or handle, N, is formed on the cam H, for the purpose of turning it.

The twin hook above described may be easily and securely fastened and unfastened in exposed situations, as on the topsails of shipping in rough weather, and is specially useful therefor.

I am aware that twin hooks have been made jointed together by a pin and slot, and having a projection on one hook engaging in a notch in the other, in which they are retained by a strain on the tackle when closed, and held apart by a latch and notch when open. Such hooks are objectionable on account of the difficulty of disengaging them when under a strain, and require both hands to be used in applying and closing them. Such hooks I distinctly disclaim; but

What I claim as my invention is—

The twin hook A, consisting of the part provided at one end with the ring B and at the other end with the hook C, the hook D pivoted at F, and the cam H pivoted at I, and held in place by the spring L, and adapted to enter a slot, G, all substantially as shown and described.

H. HARRISON COLE.

Witnesses:
    ANDW. J. BOSWELL,
    S. LLOYD WIEGAND.